US012677762B2

(12) United States Patent
Baquedo-Phinn

(10) Patent No.: US 12,677,762 B2
(45) Date of Patent: Jul. 14, 2026

(54) FLOWERPOT SHADE APPARATUS

(71) Applicant: Sharon Baquedo-Phinn, Poinciana, FL (US)

(72) Inventor: Sharon Baquedo-Phinn, Poinciana, FL (US)

( * ) Notice: Subject to any disclaimer, the term of this patent is extended or adjusted under 35 U.S.C. 154(b) by 0 days.

(21) Appl. No.: 18/738,530

(22) Filed: Jun. 10, 2024

(65) Prior Publication Data

US 2025/0374870 A1 Dec. 11, 2025

(51) Int. Cl.
*A01G 13/22* (2025.01)

(52) U.S. Cl.
CPC .................................... *A01G 13/22* (2025.01)

(58) Field of Classification Search
CPC ...... A01G 13/22; A01G 13/26; A01G 13/262; A01G 13/264; A01G 13/21; E04H 15/38
See application file for complete search history.

(56) References Cited

U.S. PATENT DOCUMENTS

| | | | | |
|---|---|---|---|---|
| 5,690,134 A | * | 11/1997 | McCauley | .............. A47G 9/062 |
| | | | | 135/900 |
| 10,130,046 B1 | * | 11/2018 | Cameron | ............... A01G 13/21 |
| 2002/0124877 A1 | * | 9/2002 | Dufort | .................. E04H 15/003 |
| | | | | 135/124 |
| 2010/0122490 A1 | * | 5/2010 | Stewart | .................. A01G 13/22 |
| | | | | 47/29.5 |
| 2012/0042920 A1 | * | 2/2012 | Armstrong | ............ E04H 15/003 |
| | | | | 135/153 |

FOREIGN PATENT DOCUMENTS

| | | | | | |
|---|---|---|---|---|---|
| CN | 107750714 A | * | 3/2018 | | |
| DE | 9207749 U1 | * | 10/1992 | | |
| DE | 9310571 U1 | * | 9/1994 | | |
| DE | 19726124 A1 | * | 12/1998 | ......... | A01G 13/0206 |
| DE | 10245378 A1 | * | 4/2004 | ......... | A01G 13/0212 |

* cited by examiner

*Primary Examiner* — Kristen C Hayes
(74) *Attorney, Agent, or Firm* — Daniel M. Cohn; Howard M. Cohn

(57) ABSTRACT

Disclosed embodiments provide a shading apparatus for a flowerpot. Anchors attach a shade (canopy) to the flowerpot. The shade can be adjusted to an extended position to provide shade, or a retracted position to allow direct sunlight to reach one or more plants in the flowerpot.

18 Claims, 7 Drawing Sheets

FLOWERPOT SHADE APPARATUS

FIELD

The present invention relates generally to gardening, and more particularly, to a flowerpot shade apparatus.

BACKGROUND

Gardening by planting flowers in flowerpots offers numerous benefits, both practical and aesthetic. Flowerpots can be easily moved to different locations to optimize sunlight exposure or protect plants from adverse weather conditions. Furthermore, flowerpots can be ideal for small spaces, such as balconies, patios, and rooftops, where traditional garden beds might not be feasible. Flowerpots can be arranged on shelves, hung, or stacked to create vertical gardens, maximizing limited space. Flowerpots also enable finer control over growing conditions. Gardeners can select and control the type of soil used, ensuring optimal conditions for each flower species. Flowerpots can also enable drainage management, as flowerpots with good drainage prevent waterlogging and root rot, ensuring healthier plants. Flowerpots can also serve as decorative elements. Flowerpots come in various shapes, sizes, and materials, adding decorative value to gardens, patios, and indoor spaces. Flowerpots can also enable creative arrangements and the mixing of different flower species, enhancing visual appeal. Moreover, flowerpots can have environmental benefits. Potted plants can contribute to urban greening efforts, improving air quality and providing habitats for pollinators. Also, potted plants can help moderate temperatures in urban environments by providing shade and reducing heat absorption. Flowerpots can also promote the therapeutic effects of gardening. Gardening and tending to potted plants can reduce stress and promote mental well-being. Furthermore, arranging and caring for potted plants can be a fulfilling and creative hobby. Thus, gardening by planting flowers in flowerpots offers flexibility, control, and aesthetic benefits that make it an appealing option for both novice and experienced gardeners who want to enjoy the beauty and rewards of gardening.

SUMMARY

In one embodiment, there is provided an apparatus, comprising: a frame, the frame comprising a plurality of ribs, wherein each rib of the plurality of ribs has a first end, and a second end; a canopy, wherein the canopy is affixed to the plurality of ribs; and a mounting mechanism, comprising a first anchor and a second anchor, wherein the first end of each rib is affixed to the first anchor, and wherein the second end of each rib is affixed to the second anchor, and wherein the mounting mechanism is configured and disposed to be mountable on a flowerpot.

In another embodiment, there is provided an apparatus, comprising: a frame, the frame comprising a plurality of ribs, wherein each rib of the plurality of ribs has a first end, and a second end; a canopy, wherein the canopy is affixed to the plurality of ribs, wherein the canopy is comprised of fabric, and wherein at least a portion of the canopy is comprised of water-reactive fabric; and a mounting mechanism, comprising a first anchor and a second anchor, wherein the first end of each rib is affixed to the first anchor, and wherein the second end of each rib is affixed to the second anchor, and wherein the mounting mechanism is configured and disposed to be mountable on a flowerpot.

In yet another embodiment, there is provided an apparatus, comprising: a frame, the frame comprising a plurality of ribs, wherein each rib of the plurality of ribs has a first end, and a second end; a canopy, wherein the canopy is affixed to the plurality of ribs; and a mounting mechanism, comprising a first anchor and a second anchor, wherein the first end of each rib is affixed to the first anchor, and wherein the second end of each rib is affixed to the second anchor, and wherein the mounting mechanism is configured and disposed to be mountable on a flowerpot; wherein the first anchor includes a first spring-loaded clip, and wherein the second anchor includes a second spring-loaded clip, and wherein the first spring-loaded clip and the second spring-loaded clip each comprises two complementary curved contact-bearing portions.

BRIEF DESCRIPTION OF THE DRAWINGS

The structure, operation, and advantages of the present invention will become further apparent upon consideration of the following description taken in conjunction with the accompanying figures (FIGs). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

Figure 1A:
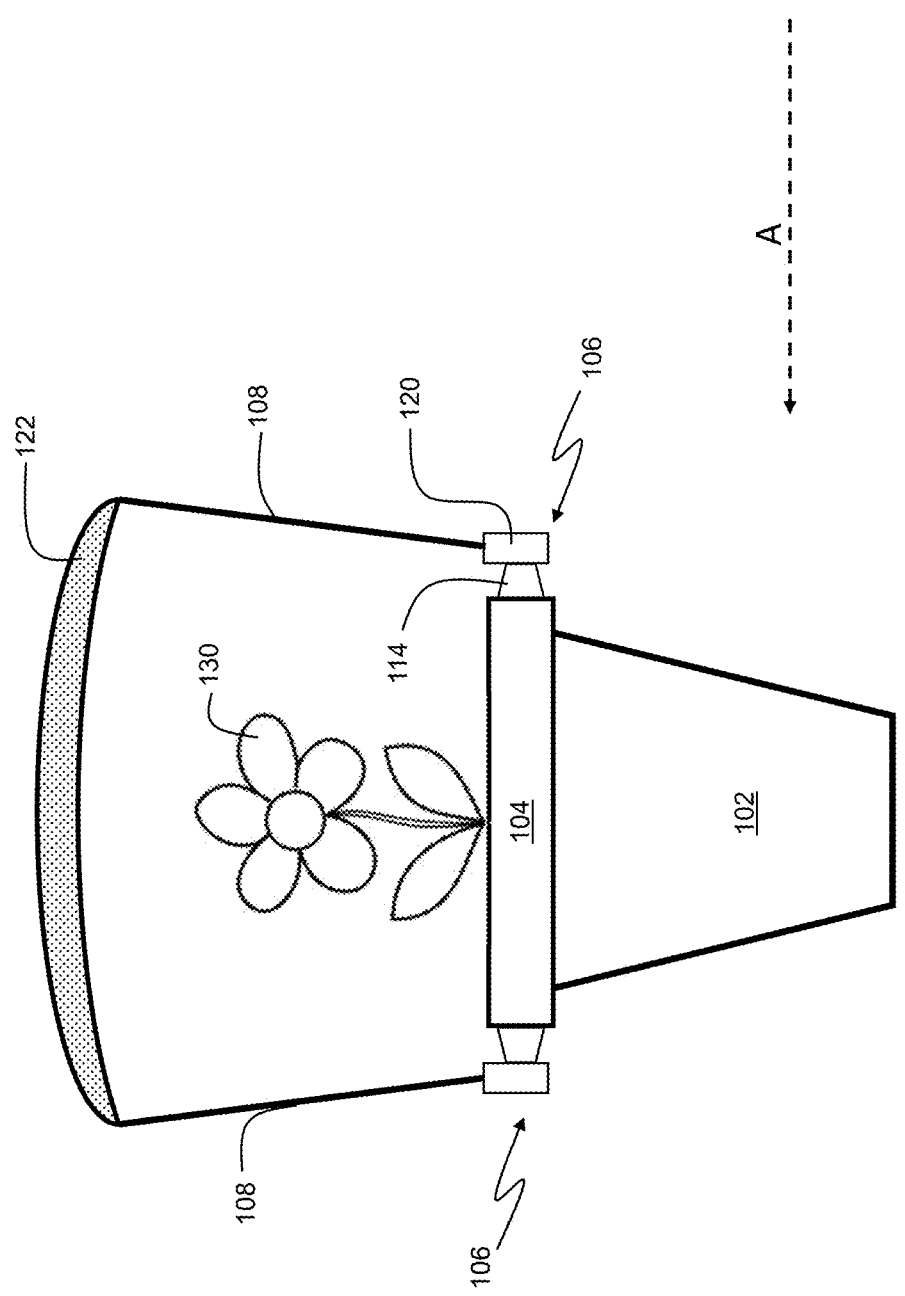

Often, similar elements may be referred to by similar numbers in various figures (FIGs) of the drawing, in which case typically the last two significant digits may be the same, the most significant digit being the number of the drawing figure (FIG). Furthermore, for clarity, some reference numbers may be omitted in certain drawings.

FIG. 1A shows a front view of an embodiment of the present invention.

Figure 1B:
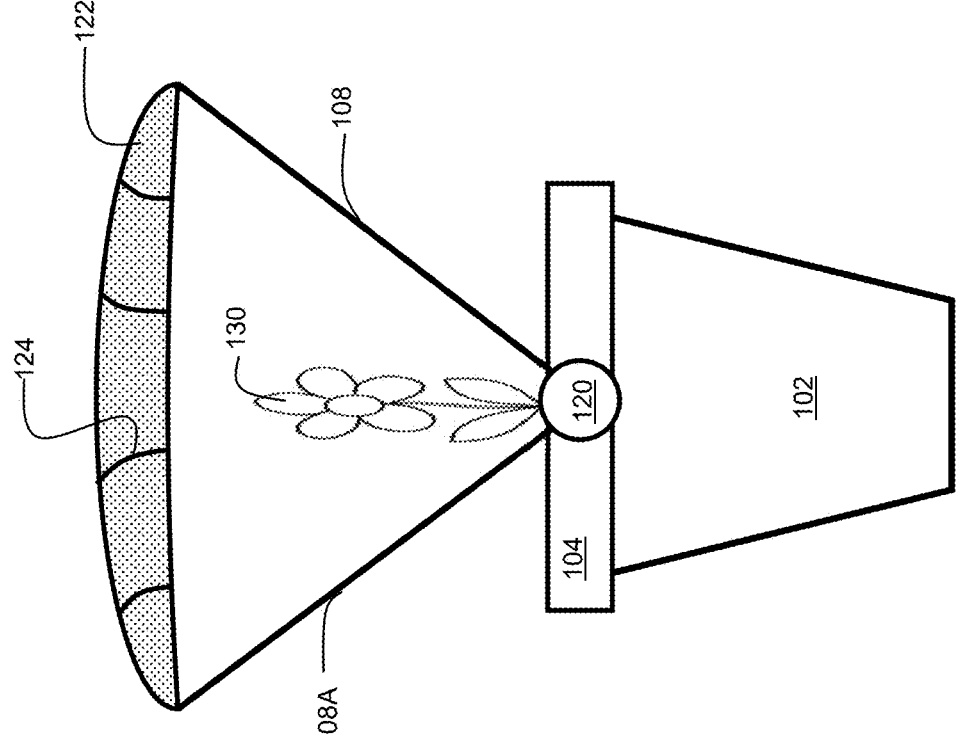

FIG. 1B shows a side view of the embodiment of FIG. 1A.

Figure 1C:
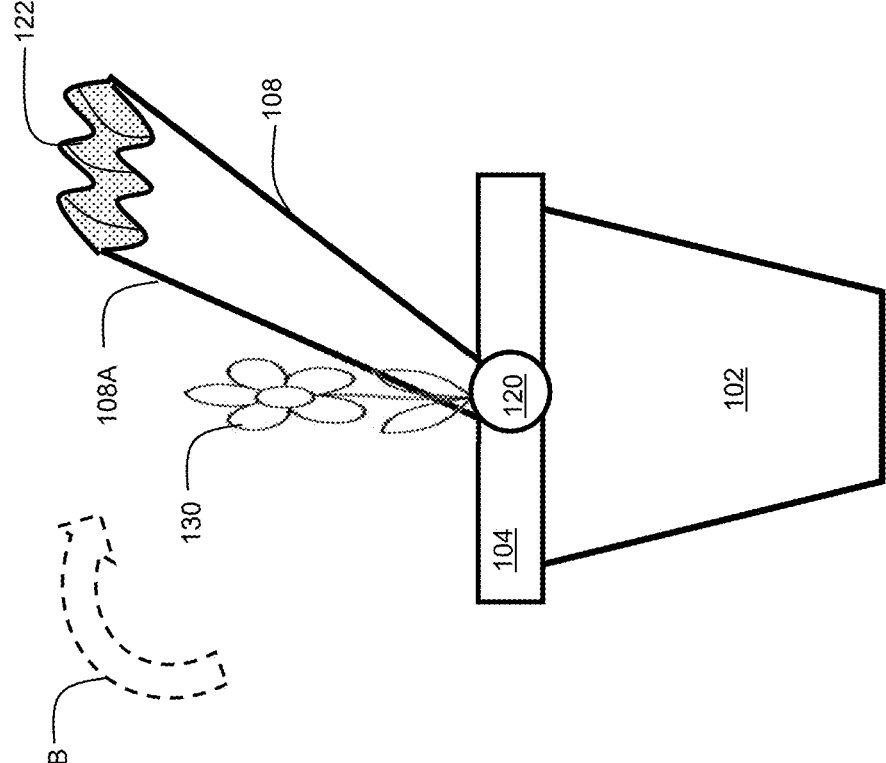

FIG. 1C shows the apparatus of FIG. 1B in a retracted configuration.

Figure 2:
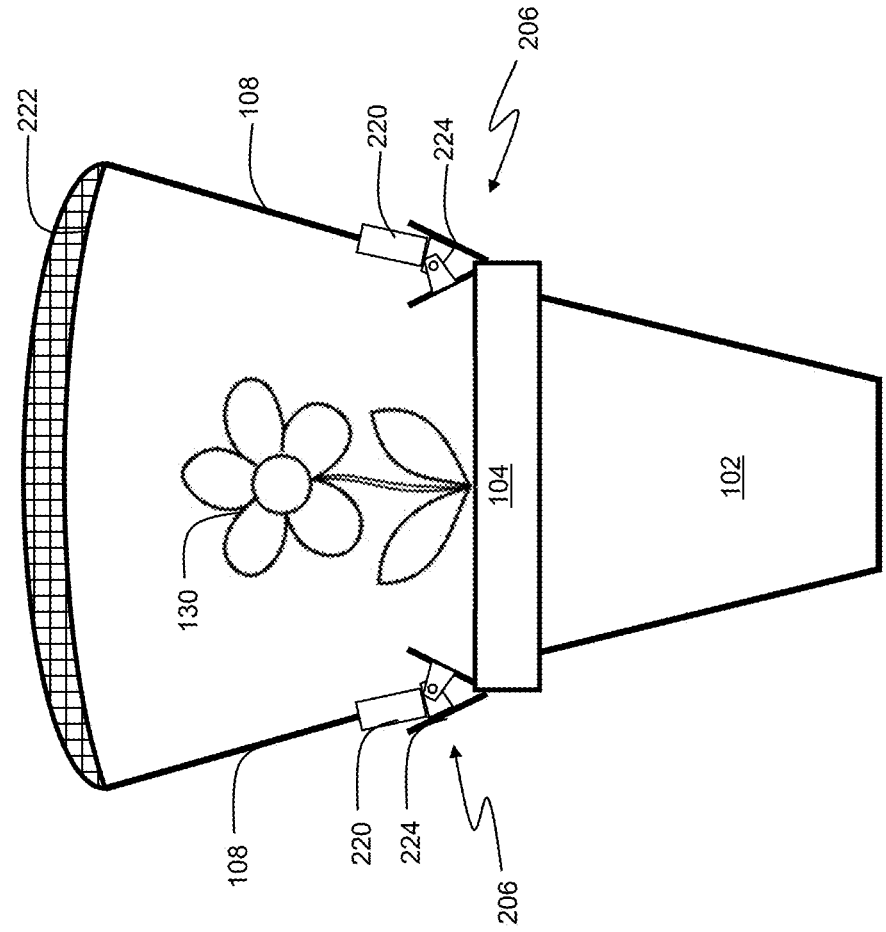

FIG. 2 shows a front view of an additional embodiment of the present invention.

Figure 3B:
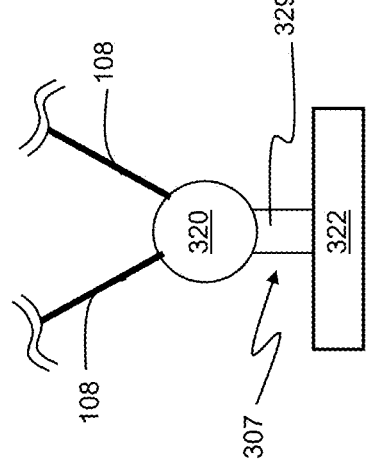
Figure 3A:
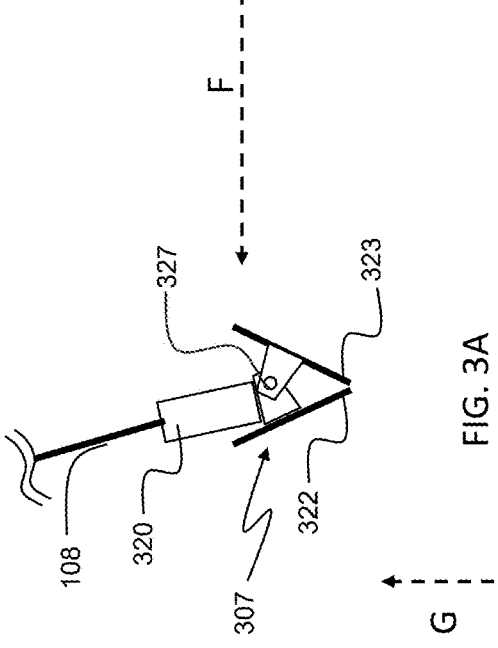

FIG. 3A shows a side view of an anchor utilizing a clip, in accordance with embodiments of the present invention.

FIG. 3B shows a front view of the anchor of FIG. 3A, in accordance with embodiments of the present invention.

Figure 3C:
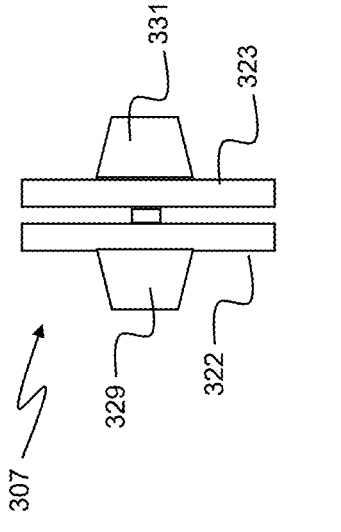

FIG. 3C shows a bottom-up view of the anchor of FIG. 3A, in accordance with embodiments of the present invention.

Figure 4:
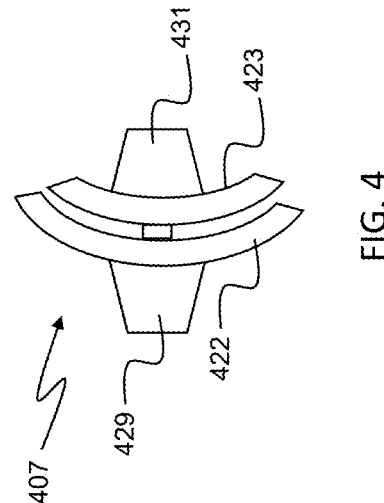

FIG. 4 shows a bottom-up view of an anchor in accordance with an alternate embodiment.

Figure 5:
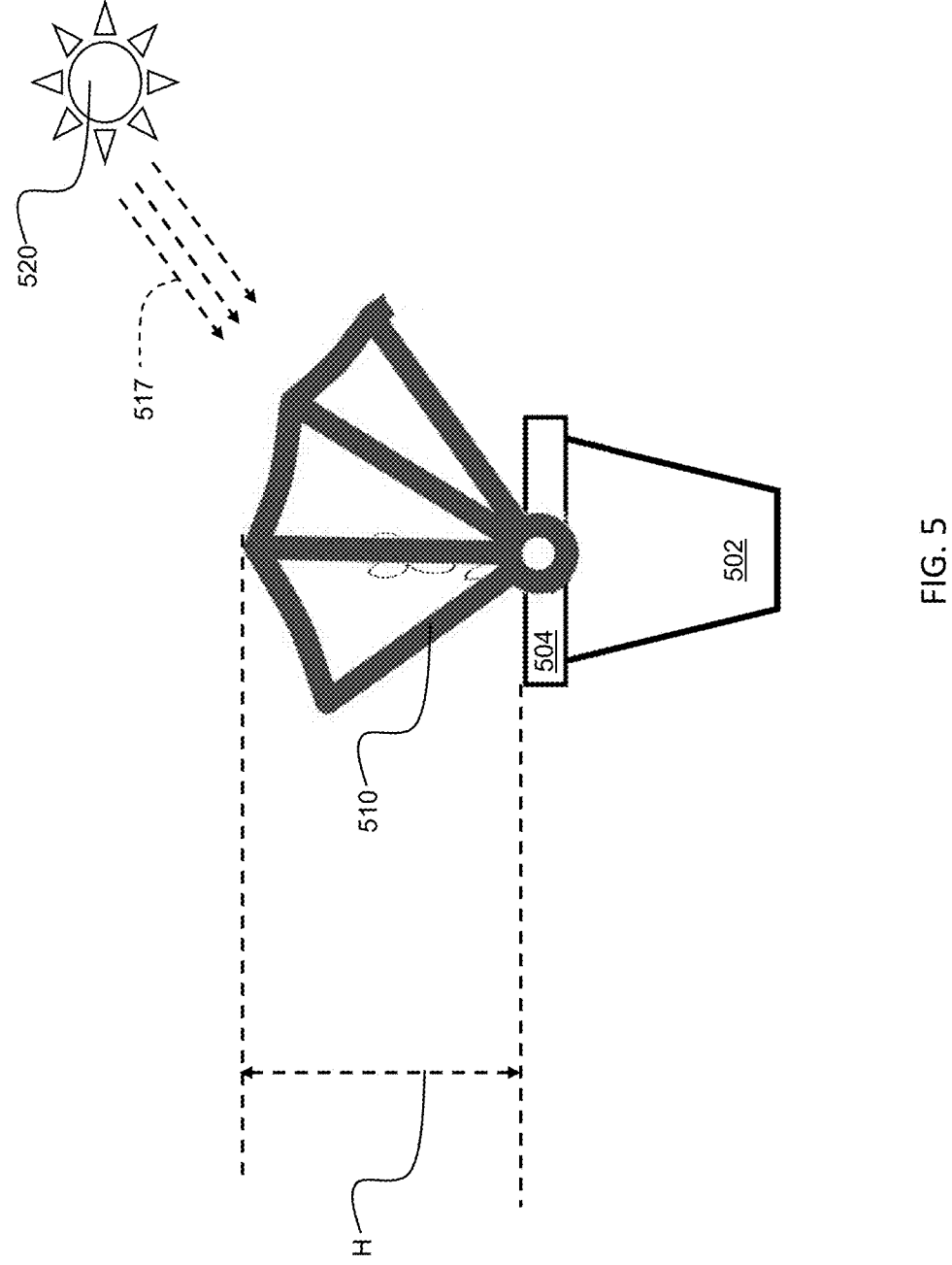

FIG. 5 shows an exemplary usage of an embodiment.

Figure 6:
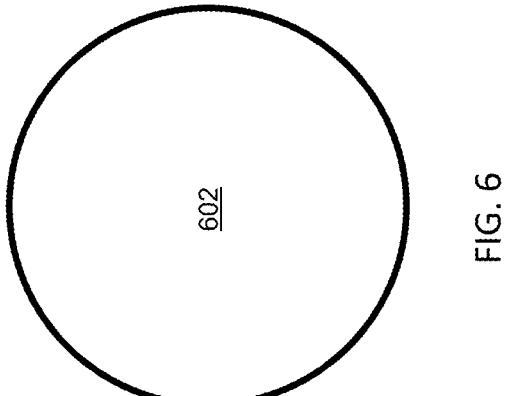

FIG. 6 shows a top-down view of a round flowerpot that can be used with disclosed embodiments.

Figure 7:
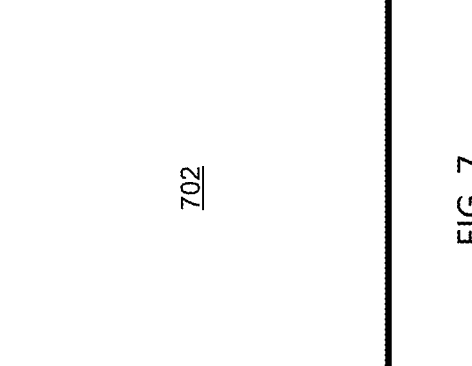

FIG. 7 shows a top-down view of a square flowerpot that can be used with disclosed embodiments.

Figure 8:
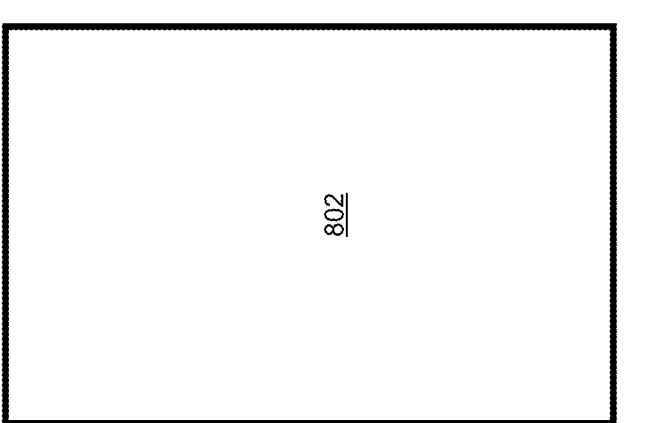

FIG. 8 shows a top-down view of a rectangular flowerpot that can be used with disclosed embodiments.

DETAILED DESCRIPTION

Too much direct sunlight can have several adverse effects on flowers, which can affect their growth, health, and overall appearance. The intense heat from direct sunlight can cause the leaves to become scorched or burned, leading to brown, crispy edges and patches. Leaves may turn yellow or white, indicating sunburn or damage from excessive UV exposure.

Additionally, high temperatures and intense sunlight increase the rate of evaporation, leading to rapid water loss from the soil and the plant itself. Flowers may wilt and droop due to dehydration, even if they are watered regularly. Furthermore, excessive sunlight can cause the soil to dry out quickly, reducing the availability of nutrients to the plant roots. The excessive sunlight can cause plant stress. Plants under stress from too much sun may not absorb nutrients efficiently, leading to deficiencies. Moreover, delicate flower petals can become scorched and discolored from direct sun exposure, and flowers exposed to too much sunlight may bloom for shorter periods or produce fewer flowers.

Disclosed embodiments address the aforementioned problems by providing a shade (canopy) that is attachable to a flowerpot by suction cups, clips, or other suitable mechanisms. The shade lets water through but blocks some sunlight and/or UV (ultraviolet) light. In some cases, the shade can be comprised of high-density polyethylene (HDPE) mesh. The shade is disposed over a frame of rigid or semi-rigid ribs that are rotatably attached to a fixture that attaches to the flowerpot. The ribs can be comprised of a metal such as aluminum, or a plastic, fiberglass, or other suitable material.

By blocking direct sunlight, disclosed embodiments protect plants from leaf scorching and sunburn, which can damage leaves and flowers. Shading plants helps prevent overheating and reduces the stress caused by excessive heat, promoting healthier growth. Excessive UV light can be harmful to plants, leading to DNA damage and inhibited growth. Disclosed embodiments reduce UV light, and serve to protect plants from these adverse effects. Moreover, disclosed embodiments allow rainwater to seep through the shade, ensuring that plants receive natural watering, which is often better for their growth compared to tap water due to the presence of beneficial nutrients in rainwater.

The descriptions throughout this disclosure contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1A shows a front view of an embodiment of the present invention. Flowerpot 102 has a rim portion 104. The canopy 122 is disposed over the flowerpot 102 such that a plant, such as plant 130 is shaded by the canopy 122. One or more ribs, indicated as 108, are attached to a mounting mechanism 106 on opposite sides of the flowerpot 102. In embodiments, a suction cup 114 serves to affix anchor 120 to the flowerpot 102. In embodiments, the first anchor includes a first suction cup, and the second anchor includes a second suction cup. One or more of the ribs 108 may be rotatably attached to the first anchor and/or the second anchor. This enables the canopy 122 to be easily retracted as needed to enable plants in the flowerpot to obtain additional sunlight. In embodiments, the ribs 108 can be elongated members having a first end and a second end, and wherein the first end of at least one rib is affixed to the first anchor, and wherein the second end of each rib is affixed to the second anchor, and wherein the mounting mechanism is configured and disposed to be mountable on a flowerpot.

FIG. 1B shows a side view of the embodiment of FIG. 1A, as viewed from the direction of arrow A indicated in FIG. 1A. In the view shown in FIG. 1B, it can be seen that multiple ribs indicated as 108A and 108 are affixed to anchor 120, and also serve to support the canopy 122. The canopy may further include additional ribs, indicated generally as 124, to create the shape of the canopy 122. In embodiments, the canopy 122 may be comprised of a flexible material. In one or more embodiments, the canopy 122 can be comprised of a high-density polyethylene (HDPE) mesh. In some embodiments, the canopy 122 can be comprised of canvas, or other suitable fabric. In some embodiments, at least a portion of the canopy can be comprised of water-reactive fabric. Water-reactive fabric is a type of material that changes color or reveals a hidden design when it comes into contact with water. Unlike traditional dyes or pigments, which rely on chemicals, water-reactive fabric uses structural color. A color-changing effect occurs when the water-reactive fabric gets wet, due to the arrangement of surfaces within the material, reflecting specific hues. In embodiments that include water-reactive fabric, the change in color when wet can provide an indication that precipitation may have recently occurred. This can be useful for potted plants that are kept outdoors. When the water-reactive fabric indicates that precipitation has fallen, a user can remove or retract the canopy to allow additional sunlight to reach the plant(s) in the flowerpot. In some embodiments, the canopy 122 can be comprised of plastic. The canopy 122 can be comprised of a screen that reduces direct sunlight while still allowing rainwater to pass through, enabling hydration for plants in the flowerpot 102.

FIG. 1C shows the apparatus of FIG. 1B in a retracted configuration. In the view shown in FIG. 1C, it can be seen that the rib indicated as 108A is moved in the direction indicated by arrow B. In one or more embodiments, the ribs 108A and/or 108 are rotatably attached to the anchor 120 with a friction fit, such that when a rib is moved to a particular position, it remains in that position. In embodiments, one or more of the plurality of ribs are rotatably attached to the first anchor and the second anchor.

FIG. 2 shows a front view of an additional embodiment of the present invention. In the embodiment of FIG. 2, mounting mechanisms 206 utilize spring loaded clips, indicated as 224, instead of suction cups as in the embodiment shown in FIG. 1A-FIG. 1C. Anchors 220 are affixed to the clips 224, and one or more ribs 108 are affixed to the anchors as previously described. In the embodiment shown in FIG. 2, the canopy 222 comprises a screen material. The screen can be comprised of plastic, metal, or other suitable materials. In embodiments, each opening in the screen has a size ranging from 1 square millimeter to 3 square millimeters. In this way, the screen serves to reduce direct sunlight that reaches the plant 130, while enabling rainwater to seep through the canopy 222. In embodiments, the first anchor includes a first spring-loaded clip, and the second anchor includes a second spring-loaded clip.

FIG. 3A shows a side view of an anchor utilizing a clip 307, in accordance with embodiments of the present invention. The clip shown in FIG. 3A can be used in embodiments such as shown in FIG. 2. The clip comprises a first portion 322 and a second portion 323 that are joined together by a spring-loaded junction 327 that urges the first portion 322 and second portion 323 to approach each other as shown in FIG. 3A. Thus, in embodiments, the clip can attach to a rim of a flowerpot for supporting the canopy.

FIG. 3B shows a front view of the anchor of FIG. 3A, as viewed from the direction of line F in FIG. 3A, in accordance with embodiments of the present invention. As can be seen in FIG. 3B, the clip 307 can include a lever portion 329 that attaches to the first portion 322 of the clip. A similar lever portion (visible in FIG. 3C) attaches to the second portion 323 of the clip. The lever portions are affixed to the spring-loaded junction 327 (FIG. 3A), to provide the gripping force that enables the clip to be removably attached to a flowerpot. The anchor 320 (similar to anchor 220 of FIG. 2, and anchor 120 of FIG. 1A), is affixed to the clip 307, and the anchor 320 is also affixed to one or more ribs 108 that support canopies of disclosed embodiments.

FIG. 3C shows a bottom-up view of the anchor of FIG. 3A, as viewed from the direction of line G in FIG. 3A, in accordance with embodiments of the present invention. As can be seen in FIG. 3B, the clip 307 can include a lever portion 329 that attaches to the first portion 322 of the clip. A similar lever portion 331 attaches to the second portion 323 of the clip. The lever portions are affixed to the spring-loaded junction 327 (FIG. 3A), to provide the gripping force that enables the clip to be removably attached to a flowerpot.

FIG. 4 shows a bottom-up view of an anchor in accordance with an alternate embodiment. As can be seen in FIG. 4, the clip 407 can include a lever portion 429 that attaches to the first portion 422 of the clip. A similar lever portion 431 attaches to the second portion 423 of the clip. The lever portions are affixed to a spring-loaded junction (such as shown at 327 of FIG. 3A), to provide the gripping force that enables the clip to be removably attached to a flowerpot. A key difference between the embodiment shown in FIG. 4 and the embodiment shown in FIG. 3A-FIG. 3C, is clip 307 (shown in FIG. 3A-3C) has straight clip first portion and second portion (i.e., 322 and 323 as shown in FIG. 3C), while the clip 407 shown in FIG. 4 has a curved first portion 422 and a curved second portion 423. Thus, in embodiments, each spring-loaded clip comprises two complementary curved contact-bearing portions. This feature enables disclosed embodiments to achieve a more secure grip on round or oval flowerpots as the complementary curved contact-bearing portions provided by clip 407 enable increased contact area between the clip and the rim of a flowerpot.

FIG. 5 shows an exemplary usage of an embodiment. As can be seen in FIG. 5, a canopy 510 is installed on flowerpot 502, using techniques as previously described. The sun 520 produces sunlight, indicated as 517. However, the canopy 510 prevents direct sunlight from reaching plants within flowerpot 502. In this way, overexposure to direct sunlight of potted plants can be prevented. As can be seen in FIG. 5, the canopy 510 extends a height indicated as H, above the rim 504. In one or more embodiments, the height H can range from 25 centimeters to 130 centimeters. Other sizes are possible in one or more embodiments. In embodiments, there can be different sizes of canopies that accommodate different heights of potted plants. As an example, a user can start with a canopy that provides a height of 25 centimeters, and then as the plant grows, replace the canopy with another canopy that has a height of 50 centimeters, and then later replace the 50 cm canopy with another canopy that has a height of 100 cm, and so on. In this way, disclosed embodiments can accommodate a variety of plant and flowerpot sizes, and canopies can be easily exchanged as a plant grows, enabling beneficial shading of the potted plants during the course of their growth.

FIG. 6 shows a top-down view of a round flowerpot 602 that can be used with disclosed embodiments. In embodiments, the canopy may be affixed to the flowerpot 602 via suction cups, such as shown at 114 in FIG. 1A. In embodiments, the canopy may be affixed to the flowerpot 602 with one or more clips, such as clips that provide complementary curved contact-bearing portions such as shown with clip 407 as shown in FIG. 4.

FIG. 7 shows a top-down view of a square flowerpot 702 that can be used with disclosed embodiments. In embodiments, the canopy may be affixed to the flowerpot 702 via suction cups, such as shown at 114 in FIG. 1A. In embodiments, the canopy may be affixed to the flowerpot 702 with one or more clips, such as clips that provide a straight clip first portion and second portion, where the straight clip first portion and straight clip second portion are substantially parallel to each other, such as shown with clip 307 as shown in FIG. 3C.

FIG. 8 shows a top-down view of a rectangular flowerpot 802 that can be used with disclosed embodiments. Similar to the square flowerpot 702 of FIG. 7, in embodiments, the canopy may be affixed to the flowerpot 802 via suction cups, such as shown at 114 in FIG. 1A. In embodiments, the canopy may be affixed to the flowerpot 802 with one or more clips, such as clips that provide a straight clip first portion and second portion, where the straight clip first portion and straight clip second portion are substantially parallel to each other, such as shown with clip 307 as shown in FIG. 3C.

As can now be appreciated, disclosed embodiments provide an apparatus that enables convenient shading of potted plants as needed. Thus, disclosed embodiments serve to prevent potted plants and flowers from wilting and/or drying out. Additionally, other issues, such as root stress, flower color fading, and/or soil overheating can also be reduced by using the shading/canopy apparatus of disclosed embodiments. In embodiments, the canopy can be comprised of a sturdy, see-through mesh cloth that provides protection from sunlight and/or UV (ultraviolet) light. Disclosed embodiments can be collapsable for ease of storage, and can be reusable for multiple growing seasons. Additionally, disclosed embodiments can be built in a variety of sizes to accommodate different sizes of plants, as well as the changing size of plants over the course of the growth cycle. Thus, disclosed embodiments can enable healthier and more aesthetically pleasing gardens and landscapes.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An apparatus, comprising:
   a frame, the frame comprising a plurality of ribs, wherein each rib of the plurality of ribs has a first end, and a second end;
   a canopy, wherein the canopy is affixed to the plurality of ribs; and
   a mounting mechanism, comprising a first anchor and a second anchor, wherein the first end of each rib is affixed to the first anchor, and wherein the second end of each rib is affixed to the second anchor, and wherein the mounting mechanism is configured and disposed to be mountable on a flowerpot;
   wherein the first anchor includes a first suction cup, and wherein the second anchor includes a second suction cup.

2. The apparatus of claim 1, wherein the plurality of ribs is comprised of plastic.

3. The apparatus of claim 1, wherein the plurality of ribs is comprised of fiberglass.

4. The apparatus of claim 1, wherein the plurality of ribs is comprised of metal.

5. The apparatus of claim 4, wherein the plurality of ribs is comprised of aluminum.

6. The apparatus of claim 1, wherein one or more of the plurality of ribs are rotatably attached to the first anchor and the second anchor.

7. The apparatus of claim 1, wherein the canopy is made of a screen, wherein the screen is operative to reduce direct sunlight, reaches a plant disposed in the flowerpot, and enables g rainwater to seep through.

8. The apparatus of claim 1, wherein the canopy is made of a high-density polyethylene (HDPE) mesh or canvas.

9. An apparatus, comprising:
   a frame, the frame comprising a plurality of ribs, wherein each rib of the plurality of ribs has a first end, and a second end;
   a canopy, wherein the canopy is affixed to the plurality of ribs, wherein the canopy is comprised of fabric, and wherein at least a portion of the canopy is comprised of water-reactive fabric; and
   a mounting mechanism, comprising a first anchor and a second anchor, wherein the first end of each rib is affixed to the first anchor, and wherein the second end of each rib is affixed to the second anchor, and wherein the mounting mechanism is configured and disposed to be mountable on a flowerpot.

10. The apparatus of claim 9, wherein the plurality of ribs is comprised of plastic.

11. The apparatus of claim 10 wherein one or more of the plurality of ribs are rotatably attached to the first anchor and the second anchor.

12. The apparatus of claim 10, wherein the first anchor includes a first suction cup, and wherein the second anchor includes a second suction cup.

13. The apparatus of claim 10, wherein the first anchor includes a first spring-loaded clip, and wherein the second anchor includes a second spring-loaded clip.

14. The apparatus of claim 9, wherein the plurality of ribs is comprised of fiberglass.

15. The apparatus of claim 9, wherein the plurality of ribs is comprised of metal.

16. The apparatus of claim 15, wherein the plurality of ribs is comprised of aluminum.

17. An apparatus, comprising:

a frame, the frame comprising a plurality of ribs, wherein each rib of the plurality of ribs has a first end, and a second end;

a canopy, wherein the canopy is affixed to the plurality of ribs; and a mounting mechanism, comprising a first anchor and a second anchor, wherein the first end of each rib is affixed to the first anchor, and wherein the second end of each rib is affixed to the second anchor, and wherein the mounting mechanism is configured and disposed to be mountable on a flowerpot;

wherein the first anchor includes a first spring-loaded clip, and wherein the second anchor includes a second spring-loaded clip, and wherein the first spring-loaded clip and the second spring-loaded clip each comprises two complementary curved contact-bearing portions.

18. The apparatus of claim 17, wherein the plurality of ribs is comprised of metal.

\* \* \* \* \*